(12) United States Patent
Zhan et al.

(10) Patent No.: US 8,345,764 B2
(45) Date of Patent: Jan. 1, 2013

(54) MOTION ESTIMATION DEVICE HAVING MOTION ESTIMATION PROCESSING ELEMENTS WITH ADDER TREE ARRAYS

(75) Inventors: Jinfeng Zhan, Suwon-si (KR); Jong-seon Kim, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 880 days.

(21) Appl. No.: 12/384,150

(22) Filed: Apr. 1, 2009

(65) Prior Publication Data

US 2009/0252230 A1    Oct. 8, 2009

(30) Foreign Application Priority Data

Apr. 2, 2008    (KR) ........................ 10-2008-0030780

(51) Int. Cl.
*H04N 7/12*    (2006.01)
(52) U.S. Cl. .................................. 375/240.16
(58) Field of Classification Search ............... 375/240.16
See application file for complete search history.

(56) References Cited

U.S. PATENT DOCUMENTS

2003/0198295 A1*   10/2003   Chen et al. ............... 375/240.16
2005/0131979 A1    6/2005    Song
2006/0023959 A1    2/2006    Yang et al.
2007/0110164 A1*   5/2007    Yang ..................... 375/240.24

FOREIGN PATENT DOCUMENTS

JP    2006059341         3/2006
KR        100212847 B1   5/1999
KR    1020050053135 A    6/2005

\* cited by examiner

*Primary Examiner* — Jay Patel
*Assistant Examiner* — Richard Torrente
(74) *Attorney, Agent, or Firm* — Onello & Mello LLP

(57) ABSTRACT

In a motion estimation device and a video encoding device including the same, a motion estimation device provides a motion vector by performing a motion estimation algorithm, and includes a motion estimation unit including a processing elements that perform a calculating operation on pixel data of a block of a current frame and reference data in a search area of a reference frame and that output operation results on candidate blocks in the search area, in parallel; and a comparison and selection unit that compares the operation results provided from the motion estimation unit to each other, and that generates and outputs a motion vector corresponding to the block of the current frame.

10 Claims, 10 Drawing Sheets

FIG. 8A

| (0,0) | (0,1) | | (0,15) |
|---|---|---|---|
| (1,0) | (1,1) | | (1,15) |
| | ⋮ | ... | |
| (7,0) | (7,1) | | (7,15) |

CURRENT IMAGE MACROBLOCK

FIG. 9

| | BIT-WIDTH | LATENCY | CYCLE REQUIRED |
|---|---|---|---|
| SYSTOLIC | $N_v$ | $2 * N_h + N_v + 1$ | $(2p_h + N_h) * (2p_v + 1)$ |
| TREE | $N_v * N_h$ | $\log N_h + \log N_v + 1$ | $(2p_h + 1) * (2p_v + 1)$ |
| PRESENT INVENTION | $(N_v * N_h) / N_{at}$ | $2N_v + \log(N_h / N_{at}) + N_{at} + 1$ | $(2P_v + 1) * (2P_h / N_{st} + N_{at})$ |

MOTION ESTIMATION DEVICE HAVING MOTION ESTIMATION PROCESSING ELEMENTS WITH ADDER TREE ARRAYS

CROSS-REFERENCE TO RELATED APPLICATIONS

This application claims the benefit of Korean Patent Application No. 10-2008-0030780, filed on Apr. 2, 2008, in the Korean Intellectual Property Office, the disclosure of which is incorporated herein in its entirety by reference.

BACKGROUND

The inventive concept relates to a motion estimation device and a video encoding device including the same.

Currently, the demand for a high-quality video service is increasing due to the development of the information communications technology including the Internet and the development of various multimedia devices such as high-definition televisions (HDTVs), personal digital assistants (PDAs), and mobile phones. Thus, in order to process high-quality video data, technology for efficiently compressing large quantities of image data is required.

Motion estimation technology is widely used in video compression standards such as MPEG and H. 26x standards. Such motion estimation technology involves calculating a motion vector representing a displacement between a current image and a previous image, a displacement which is caused, for example, by a movement of an object in a video image, camera movement, image magnification, or image reduction, and is widely used in video processes such as video compression for size reduction, pixel demosaicing, and frame interpolation.

In order to calculate a motion vector, an initial determination needs to be made as to whether to perform motion estimation in pixel units or block units. In general, motion estimation is performed in block units using a video compression operation. A block matching algorithm is an algorithm in which a motion vector between a current frame and a previous frame is estimated in block units. In the block matching algorithm, a macroblock of the current frame is compared to a macroblock of the previous frame, in a determined search area of the previous frame, and then a location of the most similar macroblock is detected. That is, it is detected which location of the current frame the macroblock of the previous frame moves to. In this case, a location and size of the movement correspond to the motion vector.

A large number of motion estimation algorithms exist for calculating the motion vector. An example of the motion estimation algorithms is a full search block matching (FSBM) algorithm that is a kind of block matching algorithm. In the FSBM algorithm, all pixels in the macroblock of the current frame are compared to all macroblocks in a search area of the previous frame, which is set to have a predetermined size, and a macroblock having the minimum difference value is detected from a plurality of candidate macroblocks included in the search area. Thus, the FSBM algorithm generates a quite accurate block-based motion vector, as a result.

Meanwhile, another example of the motion estimation algorithms is a coarse-to-fine search algorithm. The coarse-to-fine search algorithm has a relatively low accuracy but has a reduced amount of operations, in comparison to the FSBM algorithm. Examples of the coarse-to-fine search algorithm are a 3-step search algorithm, a 4-step search algorithm, and a 2-dimensional (2-D) logarithmic search algorithm. This coarse-to-fine search algorithm provides a fast speed but has a problem of low image quality. Thus, in spite of a large amount of operations, the FSBM algorithm is widely used due to its simple architecture and high image quality.

A large number of motion estimation hardware technologies for implementing the FSBM algorithm exist, and these motion estimation hardware technologies may be classified into a plurality of categories including a systolic array architecture and a tree architecture.

The systolic array architecture, as motion estimation hardware, is appropriate for implementing a very large scale integration (VLSI) of a block matching algorithm and has an advantage in that reference data (for example, pixel data of the previous frame) is provided to a plurality of on-chip processing elements by performing a shift operation and thus the reuse of data is maximized. Thus, a data input bandwidth may decrease. However, a data path length through which the reference data is transmitted due to the shift operation is long and thus a delay may be increased or a problem of internal data skew may occur.

In order to avoid the above-described long delay or data skew, a tree architecture can be adopted. The tree architecture has an advantage of optimizing execution latency and is more appropriate for implementing the 3-step search algorithm. However, since the data skew does not occur in the tree architecture, data related to the candidate blocks (found macroblocks) in the search area of the previous frame have to be accessed at the same time so as to be provided to the tree architecture. Thus, the tree architecture requires a larger data input bandwidth in comparison to the systolic array architecture.

In order to provide a tradeoff between the characteristics of the systolic array architecture and the tree architecture, a hybrid tree and linear array architecture is suggested. The hybrid tree and linear array architecture is a combination of the systolic array architecture and the tree architecture. Latency and an input data bandwidth characteristic may be controlled by selecting an appropriate size of a systolic array or a sub-tree included in the hybrid tree and linear array architecture.

FIG. 1 is a block diagram of a general systolic array architecture for implementing an FSBM motion estimation algorithm. The systolic array architecture includes a one-dimensional (1-D) systolic array architecture and a 2-D systolic array architecture. The systolic array architecture illustrated in FIG. 1 is the 2-D systolic array architecture.

As illustrated in FIG. 1, if a macroblock, which is a basic processing unit of a block matching algorithm, includes Nh (the number of horizontal pixels)×Nv (the number of vertical pixels) pixels, the 2-D systolic array architecture may include Nh×Nv processing elements PE which are arranged in horizontal and vertical directions of a 2-D architecture. Each of the Nh×Nv processing elements may include a latch (not shown). Data of each pixel of the macroblock of a current frame may be pre-loaded to a corresponding processing element so as to be stored in a latch.

Also, pixel data (reference data) of a candidate macroblock in a search area of a previous frame are provided to the processing elements. Nv pieces of the pixel data of the candidate macroblock are accessed in parallel and may be provided to the processing elements based on a shift operation in a horizontal direction. Each processing element calculates an absolute difference between pixel data of the current frame and pixel data of the previous frame.

In order to detect a location of the most similar macroblock to the macroblock of the current frame from among candidate macroblocks in the determined search area of the previous frame, a cross-correlation function (CCF) method, a mean square error (MSE) method, a mean absolute error (MAE) method, and a sum of absolute differences (SAD) method may be used. Among the above-mentioned methods, the SAD method is the most widely used in actual implementation due to its low complexity and its excellent performance.

As illustrated in FIG. 1, an SAD is calculated by each predetermined unit A included in the 2-D systolic array architecture. According to the 2-D systolic array architecture, reference data is prevented from being repeatedly provided to a systolic array and previously input reference data can be reused. Thus, a data input bandwidth may decrease.

FIG. 2 is a block diagram of a general tree architecture for implementing an FSBM motion estimation algorithm. Each unit D illustrated in FIG. 2 compares current frame macroblock pixel data CURRENT DATA X and previous frame candidate macroblock pixel data REFERENCE DATA Y so as to calculate an absolute difference therebetween. Each unit A illustrated in FIG. 2 sums two absolute differences and outputs a summed absolute difference. Unlike a 2-D systolic array architecture, Nh×Nv pieces of reference data corresponding to all the number of pixels of a macroblock are accessed in parallel so as to be provided to the tree architecture. As illustrated in FIG. 2, the reference data provided to the tree architecture are not able to be reused and are repeatedly accessed several times. Thus, a data input bandwidth is increased.

Currently, as new display technologies for liquid crystal display devices (LCDs), plasma display panels (PDPs), and digital projection systems provide high-quality and large-scaled display services, there is an increased demand for image processing technology for processing high-resolution images. In particular, the amount of data to be processed per minute increases in accordance with high resolution configurations and with increased display size, and thus, the operation frequency increases.

However, the above-described various category methods based on an FSBM algorithm are not necessarily suitable for high-performance processing of a high-resolution image. In particular, a hybrid tree and linear array architecture that is used in order to provide a tradeoff between characteristics of a systolic array architecture and a tree architecture, requires a large amount of operations and thus is not appropriate for processing the high-resolution image.

SUMMARY

The inventive concept provides a motion estimation device by which a motion estimation algorithm operation is accelerated by performing full search block matching (FSBM)-based motion estimation to a hybrid tree and linear array architecture having a 2-dimensional (2-D) parallel architecture, and a video encoding device including the motion estimation device.

According to an aspect of the inventive concept, there is provided a motion estimation device providing a motion vector by performing a motion estimation algorithm, the motion estimation device including a motion estimation unit including a plurality of processing elements which perform a calculating operation on pixel data of a block of a current frame and reference data in a search area of a reference frame, and that output a plurality of operation results on a plurality of candidate blocks in the search area, in parallel; and a comparison and selection unit that compares the operation results provided from the motion estimation unit to each other, and that generates and outputs a motion vector corresponding to the block of the current frame.

The motion estimation unit may calculate and output a sum of absolute differences (SAD) between the block of the current frame and each of the candidate blocks.

The block of the current frame or each of the candidate blocks included in the search area may include Nh×Nv pixels (Nh is the number of horizontal-direction pixels and Nv is the number of vertical-direction pixels), the number of processing elements may be Nv, and each of the processing elements may perform a calculating operation on pixel data of one line of the block of the current frame.

Each of the processing elements may include first through mth adder tree arrays (m is an integer which is greater than or equal to one), and each of the first through mth adder tree arrays may include first through nth sub-trees (n is an integer which is greater than or equal to one).

Pixel data of one line of the block of the current frame may be divided into m groups so as to be separately pre-loaded to the first through mth adder tree arrays, and pixel data pre-loaded to each of the first through mth adder tree arrays may be commonly provided to the first through nth sub-trees.

The first through mth adder tree arrays each may sequentially receive the reference data with a delay time corresponding to a predetermined number of clock cycles.

Each of the processing elements may include at least one register for temporarily storing the reference data and providing the reference data to the first through mth adder tree arrays.

Each of the first through nth sub-trees may receive corresponding reference data of first through nth candidate blocks in the search area, and perform a calculating operation on the pre-loaded pixel data of the current frame and the received reference data so as to output a partial SAD.

The first through nth sub-trees which are included in the Nv processing elements may respectively output partial SADs for the first through nth candidate blocks, and the motion estimation unit may generate an SAD for each of the first through nth candidate blocks by summing the partial SADs.

The motion estimation unit may include at least one register that stores a partial SAD generated by one of the first through mth adder tree arrays; and an adder that generates at least one SAD by summing the partial SAD stored in the register and a partial SAD generated by another one of the first through mth adder tree arrays.

The motion estimation device may further include a current image data buffer that stores the pixel data of the block of the current frame; a reference image data buffer that stores the reference data in the search area of the reference frame; and a delay unit being connected between the reference image data buffer and the motion estimation unit, and that controls a delay of the reference data to be provided to the motion estimation unit.

According to another aspect of the inventive concept, there is provided a motion estimation device that performs motion estimation in units of a block including Nh×Nv pixels (Nh is the number of horizontal-direction pixels and Nv is the number of vertical-direction pixels), the motion estimation device including first through Nvth processing elements that receive pixel data of a block of a current frame and reference data of candidate blocks of a reference frame, and that perform a calculating operation on pixel data of first through Nvth lines of the block of the current frame and reference data of first through Nvth lines of the candidate blocks, wherein each of the first through Nvth processing elements may include first through mth adder tree arrays (m is an integer which is greater than or equal to one) that independently perform a tree calculating operation on the received pixel data and reference data.

Pixel data of one line of the block of the current frame can be divided into m groups so as to be separately pre-loaded to the first through mth adder tree arrays, and reference data of one line of the candidate blocks is divided into m groups so as to be separately provided to the first through mth adder tree arrays.

Each of the first through mth adder tree arrays can comprise first through nth sub-trees (n is an integer which is greater than or equal to one), and each of the first through nth sub-trees can receive reference data of first through nth candidate blocks and perform a tree calculating operation on the pre-loaded pixel data and the received reference data.

Each of the first through Nvth processing elements can calculate and output a sum of absolute differences (SAD) between the pixel data and the reference data.

The motion estimation device can further comprise at least one register being arranged so as to correspond to each of the first through Nvth processing elements and that temporarily stores the reference data, such that the reference data are provided to the first through mth adder tree arrays with a delay time corresponding to a predetermined number of clock cycles.

According to another aspect of the inventive concept, there is provided a video encoding device based on a motion vector generated by performing a motion estimation algorithm, the video encoding device including a motion estimation device that receives pixel data of a block of a current frame and reference data of a candidate block of a reference frame, that calculates a sum of absolute differences (SAD) between the pixel data and the reference data, and that generates a motion vector based on a result of the calculation, wherein the motion estimation device includes a plurality of processing elements that calculates an SAD between pixel data of one line of the block of the current frame and reference data of one line of the candidate block, and wherein the processing element includes a plurality of adder tree arrays that independently performs a tree calculating operation on portions of the pixel data of the one line of the block of the current frame.

Each of the adder tree arrays can comprise first through nth sub-trees that calculate SADs on n candidate blocks (n is an integer which is greater than or equal to two).

The motion estimation device can comprise first through Nvth processing elements that perform motion estimation in units of a block comprising Nh×Nv pixels (Nh is the number of horizontal-direction pixels and Nv is the number of vertical-direction pixels).

The motion estimation device can comprise: at least one first register being arranged so as to correspond to each of the first through Nvth processing elements and that temporarily stores the reference data, such that the reference data are provided to the adder tree arrays with a delay time corresponding to a predetermined number of clock cycles; at least one second register that stores an SAD output from one of the adder tree arrays; and an adder that generates an SAD of the candidate block by summing the SAD stored in the second register and an SAD generated by another one of the adder tree arrays.

BRIEF DESCRIPTION OF THE DRAWINGS

Exemplary embodiments of the inventive concept will be more clearly understood from the following detailed description taken in conjunction with the accompanying drawings in which:

FIG. 8A is a diagram of an example of a current image macroblock, according to an embodiment of the inventive concept;

FIG. 9 is a table showing characteristics of the motion estimation device illustrated in FIG. 3, according to an embodiment of the inventive concept.

DETAILED DESCRIPTION OF EMBODIMENTS

Figure 1:
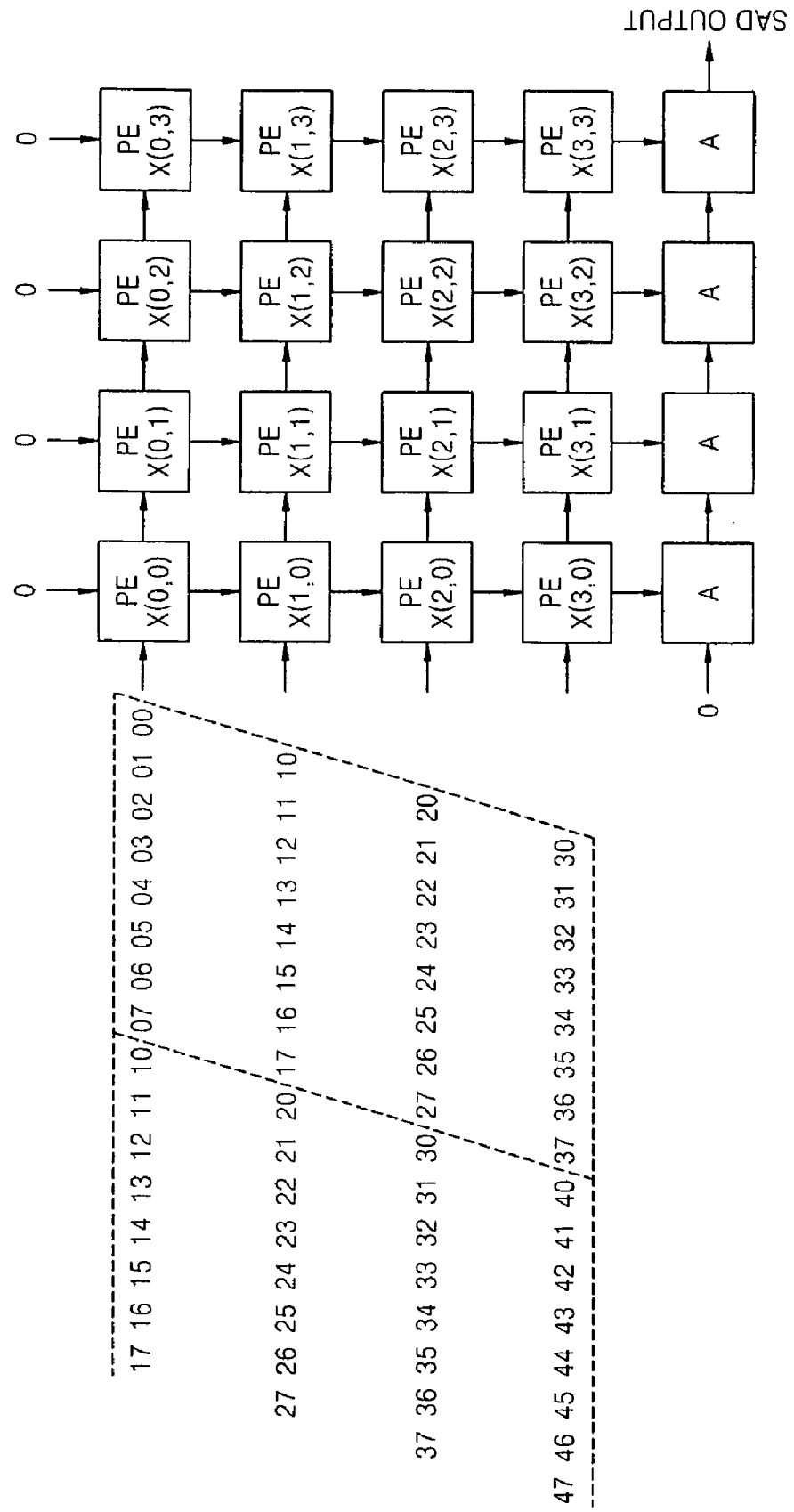
FIG. 1 is a block diagram of a general systolic array architecture for implementing a full search block matching (FSBM) motion estimation algorithm.
Figure 2:
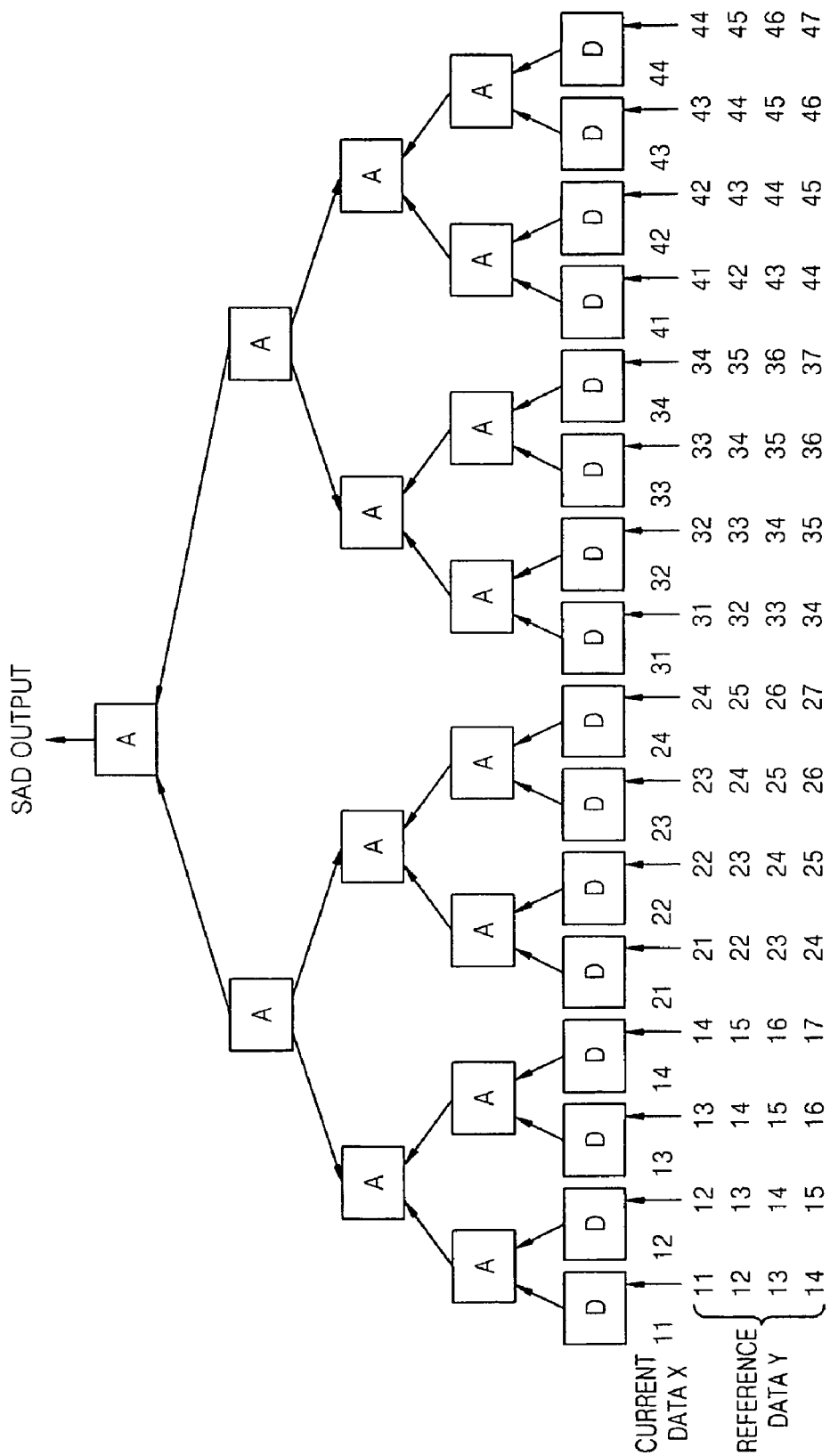
FIG. 2 is a block diagram of a general tree architecture for implementing an FSBM motion estimation algorithm.

The attached drawings for illustrating exemplary embodiments of the inventive concept are referred to in order to gain a sufficient understanding of the inventive concept, the merits thereof, and the objectives accomplished by the implementation of the inventive concept.

Hereinafter, the inventive concept will be described in detail by explaining embodiments of the inventive concept with reference to the attached drawings. Like reference numerals denote like elements in the drawings.

Figure 3:
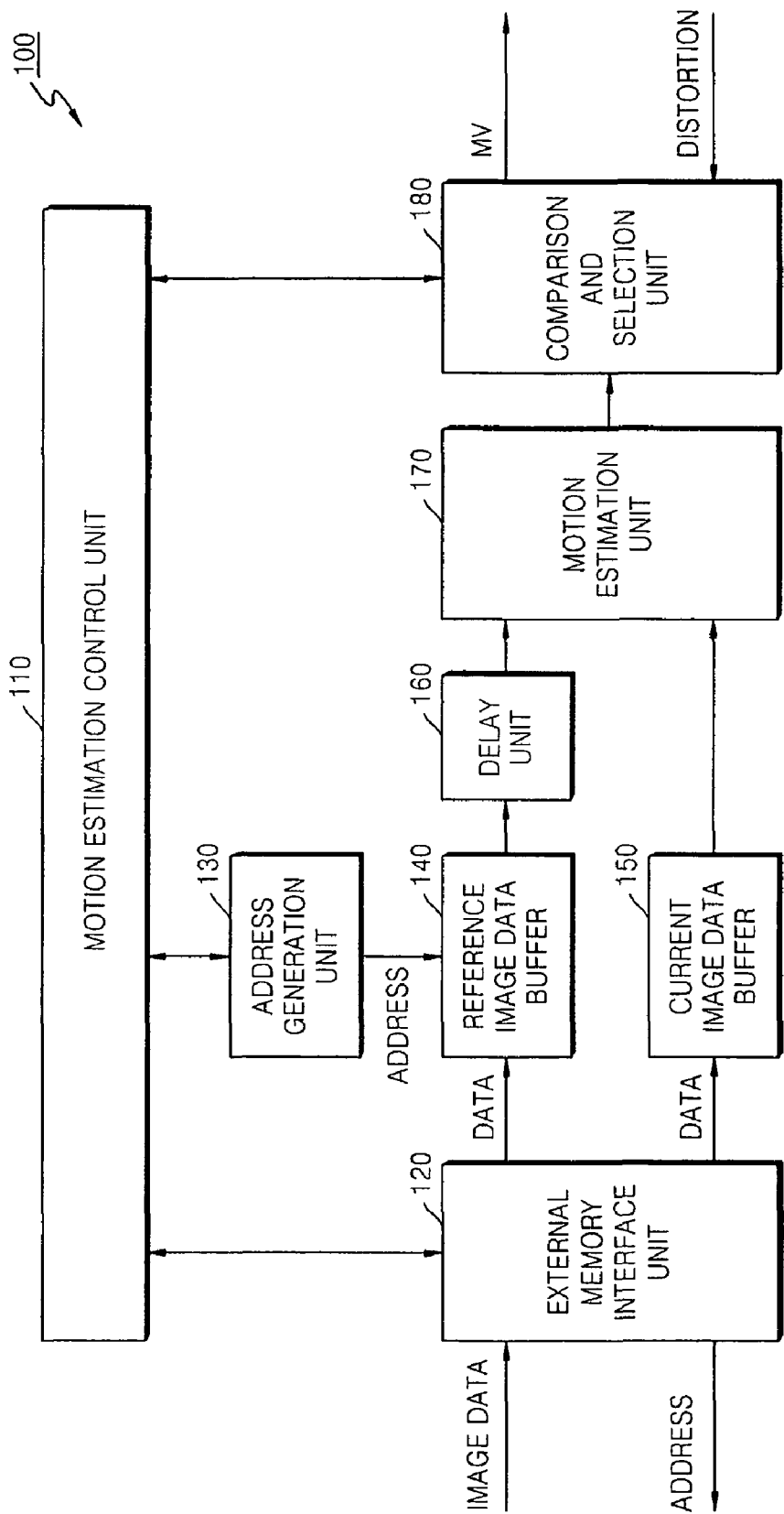
FIG. 3 is a block diagram of a motion estimation device according to an embodiment of the inventive concept.

FIG. 3 is a block diagram of a motion estimation device 100 according to an embodiment of the inventive concept. The motion estimation device 100 is used to perform motion estimation applied in video compression standards such as MPEG and H. 26x standards. Preferably, the motion estimation device 100 may be included in a data encoding device.

As illustrated in FIG. 3, the motion estimation device 100 can include a motion estimation control unit 110, an external memory interface unit 120, an address generation unit 130, a reference image data buffer 140, a current image data buffer 150, a delay unit 160, a motion estimation unit 170, and a comparison and selection unit 180.

The motion estimation control unit 110 can include a finite state machine and controls general timing of the motion estimation device 100. Preferably, the motion estimation control unit 110 can be configured to control the operations of the external memory interface unit 120 and the address generation unit 130. The other elements of the motion estimation device 100, except for the external memory interface unit 120, the address generation unit 130 and the motion estimation control unit 110, may be connected through pipeline data paths.

Initially, current image data and/or reference image data, which are input through the external memory interface unit 120, are respectively provided to, and stored in, the current image data buffer 150 and the reference image data buffer 140. Data is independently read from the current image data buffer 150 and the reference image data buffer 140. The delay unit 160 is connected between the reference image data buffer 140 and the motion estimation unit 170, and the reference image data read from the reference image data buffer 140 is provided to the motion estimation unit 170 through the delay unit 160. Also, the current image data read from the current image data buffer 150 is provided to the motion estimation unit 170.

In particular, according to an embodiment of the inventive concept, the motion estimation unit 170 includes a 2-dimensional (2-D) architecture hybrid tree and linear array to appropriately process a high-resolution image stream, and the 2-D architecture hybrid tree and linear array operates in parallel on pixel data of a macroblock of a current frame and pixel data of a search area of a previous frame. The motion estimation unit 170 calculates a difference between the pixel data of the current and previous frames and provides the difference to the comparison and selection unit 180. For example, if a sum of absolute differences (SAD) is used to detect the most similar macroblock to the macroblock of the current frame, from the search area of the previous frame, the motion estimation unit 170 generates one or more SADs so as to provide the SADs to the comparison and selection unit 180 in parallel. The comparison and selection unit 180 receives the SADs and generates and outputs a motion vector (MV) and/or a selected SAD (distortion) by comparing the received SADs.

Detailed operations of the motion estimation device 100 will now be described.

Figure 4:
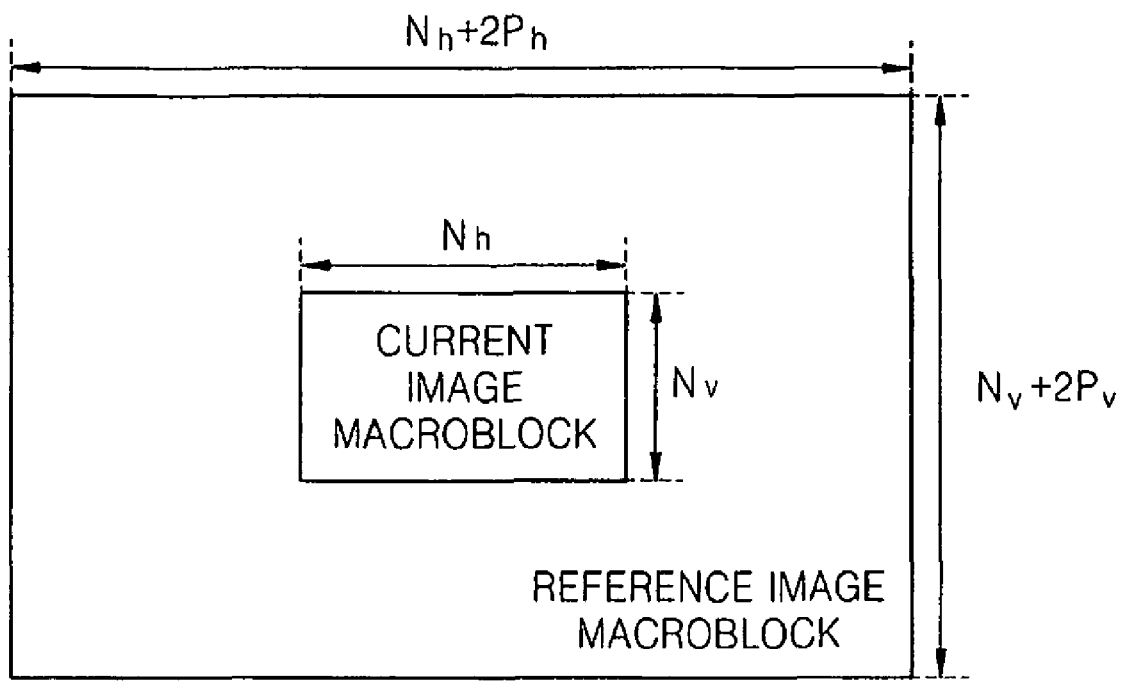
FIG. 4 is a diagram of a search area of a previous frame when a motion vector is estimated based on a block matching algorithm, according to an embodiment of the inventive concept.

FIG. 4 is a diagram of a search area of a previous frame when a MV is estimated based on a block matching algorithm, according to an embodiment of the inventive concept. As illustrated in FIG. 4, a macroblock of a current frame, which is a motion estimation unit, may include Nh (horizontal direction)×Nv (vertical directions) pixels. If a search range on the previous frame corresponds to Ph pixels separately from the left and right of the macroblock of the current frame in a horizontal direction and Pv pixels separately from the top and bottom of the macroblock of the current frame in a vertical direction, the whole search area of the previous frame may include (Nh+2Ph)×(Nv+2Pv) pixels. Also, the whole search area of the previous frame may include (2Ph+1)×(2Pv+1) candidate macroblocks that are to be compared to the macroblock of the current frame.

Figure 5:
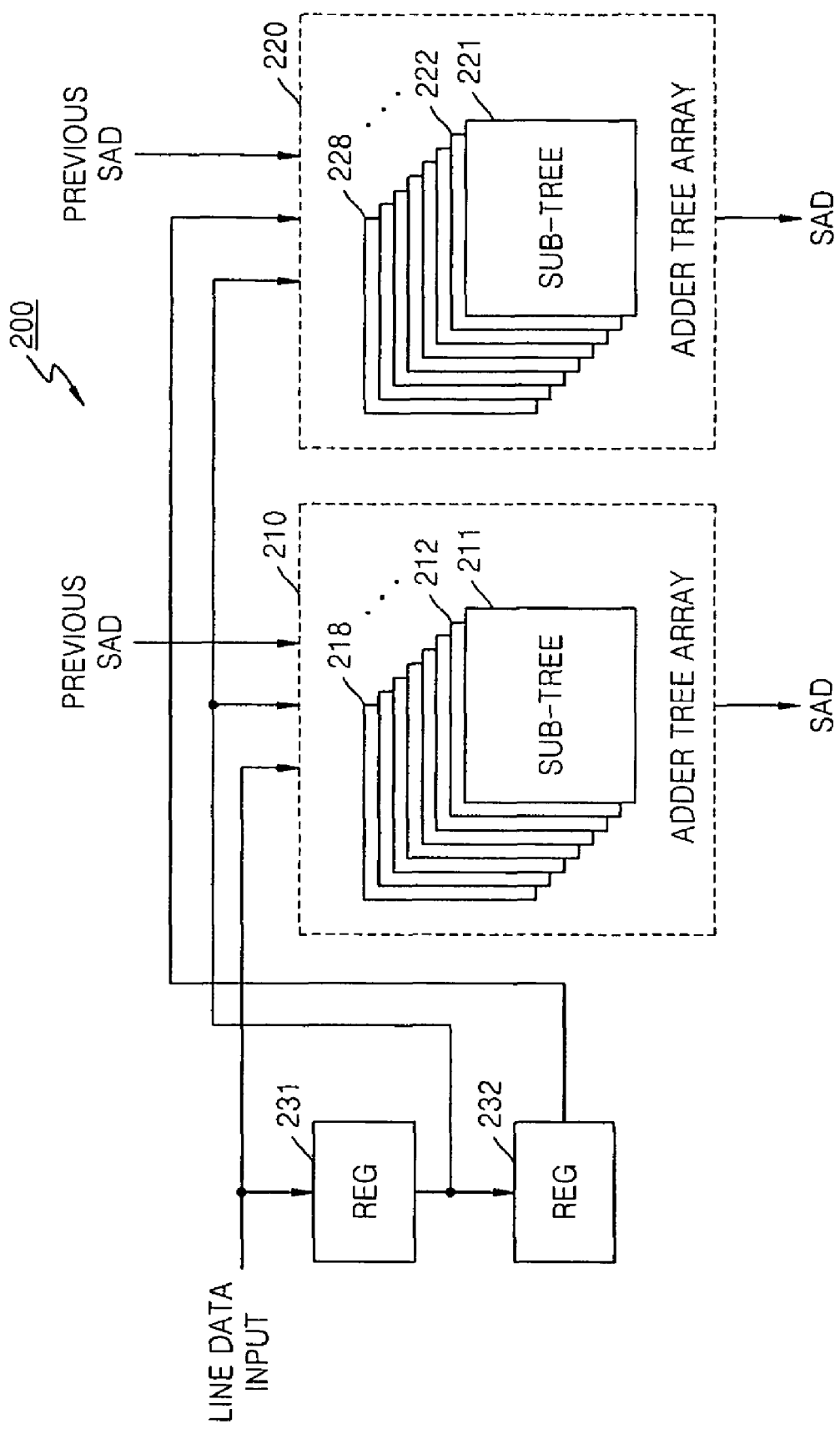
FIG. 5 is a block diagram of a processing element as a unit forming a hybrid tree and linear array, according to an embodiment of the inventive concept.

The motion estimation unit 170 illustrated in FIG. 3 includes a 2-D architecture hybrid tree and linear array, and FIG. 5 is a block diagram of a processing element 200 as a unit forming the 2-D architecture hybrid tree and linear array, according to an embodiment of the inventive concept. FIG. 5 will be described in conjunction with FIG. 3.

As illustrated in FIG. 5, the processing element 200 may include one or more adder tree arrays and pipeline registers. For example, the processing element 200 may include first and second adder tree arrays 210 and 220, and first and second pipeline registers 231 and 232.

The processing element 200 may have a combination of a tree architecture and a systolic array architecture. That is, similarly to the systolic array architecture, the first pipeline register 231 included in the processing element 200 provides previously stored reference image data to the second pipeline register 232 that is close to the first pipeline register 231, and receives new reference image data from the reference image data buffer 140 to store the new reference image data. For example, the reference image data provided to the first pipeline register 231 at a predetermined clock is provided to the second pipeline register 232 at the time of a subsequent clock. According to the above-described architecture that is similar to the systolic array architecture, the reference image data can be reused without being repeatedly input, and thus a data input bandwidth can be effectively reduced.

Meanwhile, in order to accelerate the operation speed of a motion estimation algorithm performed by the motion estimation unit 170, the operations of the motion estimation unit 170 are performed in parallel. For example, in order to detect the most similar macroblock to the macroblock of the current frame from among the candidate macroblocks included in the search area of the previous frame, the macroblock of the current frame is compared to each of (2Ph+1)×(2Pv+1) candidate macroblocks included in the search area of the previous frame. If the similarity between the macroblock of the current frame and each of the candidate macroblocks of the previous frame is determined based on an SAD method, the motion estimation unit 170 separately calculates (2Ph+1)×(2Pv+1) SADs for the (2Ph+1)×(2Pv+1) candidate macroblocks so as to provide the (2Ph+1)×(2Pv+1) SADs to the comparison and selection unit 180.

According to an embodiment of the inventive concept, the processing element 200 may include one or more adder tree arrays and each adder tree array may include a plurality of sub-trees, which are arranged in parallel. The number of SADs calculated in one clock cycle is determined in accordance with the number of sub-trees included in each adder tree array. For example, in FIG. 5, the first and second adder tree arrays 210 and 220 respectively include first through eighth sub-trees 211 through 218 and 221 through 228. Thus, the 2-D architecture hybrid tree and linear array of the motion estimation unit 170 calculates and outputs eight SADs in parallel.

In more detail, conventionally, a method of dividing a comparison target unit (for example, a macroblock unit) into a plurality of sub-units and connecting a plurality of basic architectures performing a calculating operation on the sub-units, in parallel or in series, has been suggested in order to improve operation speed. However, in that case, the number of basic architectures, which is appropriate for forming a motion estimation device, may not be easily determined because the basic architectures have, for example, different image sizes, different search area sizes, and different macroblock sizes. On the other hand, according to an embodiment of the inventive concept, the processing element 200 includes a plurality of sub-trees which are arranged in parallel such that a plurality of SADs are output in parallel.

When the processing element 200 is configured according to an embodiment of the inventive concept, an appropriate number Nat of adder tree arrays included in the processing element 200 and an appropriate number Nst of sub-trees included in each adder tree array are selected in order to determine the operation characteristics (for example, an appropriate tradeoff between a data input bandwidth and an operation speed) of the motion estimation device 100.

For example, if the processing element 200 includes one adder tree array, the processing element 200 may have a similar architecture to a tree architecture. In this case, the processing element 200 may include only one pipeline register or none. If a bit size corresponding to one pixel is W bits, the data input bandwidth of the processing element 200 corresponds to Nh×W bits.

On the other hand, if the processing element 200 includes Nh adder tree arrays, the processing element 200 may have a similar architecture to a systolic array architecture. In this case, the data input bandwidth of the processing element 200 has a value corresponding to W bits. Thus, the number Nat of adder tree arrays included in the processing element 200 determines the data input bandwidth of the processing element 200 and also determines the number of pipeline registers included in the processing element 200.

Meanwhile, the number Nst of sub-trees included in each adder tree array may determine the number of SADs output in one clock cycle. If the processing element 200 includes one adder tree array including two sub-trees, the processing element 200 may have an architecture in which the two sub-trees are arranged in parallel. Each sub-tree calculates an SAD on each candidate macroblock. If the number Nst of sub-trees included in each adder tree array is large, the time taken to perform the motion estimation algorithm may be reduced. However, a large data input bandwidth is required.

The above-described features of the inventive concept may be summarized as follows.

Initially, if a size of a macroblock, which is a comparison unit for motion estimation, is Nh×Nv pixels, the number of adder tree arrays is Nat, the number of sub-trees is Nst, and a bit size corresponding to one pixel is W bits, the processing element 200 includes Nat pipeline registers and a data input bandwidth of the pipeline registers corresponds to (Nh×W)/N bits.

Detailed operations of the processing element 200 will now be described assuming that Nh=16, Nv=8, Nat=2, and Nst=8.

The processing element 200 can generate a partial SAD by comparing pixel data of any one line in a macroblock of a current frame to pixel data of any one line included in a search area of a previous frame. For example, the macroblock, which is a motion estimation unit, may include 16×8 pixels and the whole search area of the previous frame may include (Nh+2Ph)×(Nv+2Pv) pixels. Also, it is assumed that the processing element 200 processes data of a first line in the macroblock of the current frame and a first line in the whole search area of the previous frame.

Data of sixteen pixels located in the first line of the macroblock of the current frame are pre-loaded to the processing element 200. Eight pixel data (for example, (0,0) through (0,7)) may be pre-loaded to the first adder tree array 210 and the other eight pixel data (for example, (0,8) through (0,15)) may be pre-loaded to the second adder tree array 220.

Meanwhile, reference data corresponding to a plurality of candidate macroblocks are provided to the processing element 200. The first and second adder tree arrays 210 and 220 respectively include first through eighth sub-trees 211 through 218 and 221 through 228 and thus reference data corresponding to eight candidate macroblocks may be provided to the processing element 200. First sub-trees 211 and 221 may receive reference data of a first line of a first candidate macroblock, and second sub-trees 212 and 222 may receive reference data of a first line of a second candidate macroblock. Likewise, eighth sub-trees 218 and 228 may receive reference data of a first line of an eighth candidate macroblock.

Each of first through eighth candidate macroblocks included in the whole search area may have a location difference corresponding to one pixel, from neighboring candidate macroblocks in a horizontal direction. For example, the reference data of the first line of the first candidate macroblock may be pixel data corresponding to (0,0) through (0,15) in the whole search area, and the reference data of the first line of the second candidate macroblock may be pixel data corresponding to (0,1) through (0,16) in the whole search area. Likewise, the reference data of the first line of the eighth candidate macroblock may be pixel data corresponding to (0,7) through (0,22) in the whole search area.

The first sub-tree 211 of the first adder tree array 210 calculates a partial SAD between eight pixel data (0,0) through (0,7) of a current macroblock and eight pixel data (0,0) through (0,7) of the first candidate macroblock. Also, the first sub-tree 221 of the second adder tree array 220 calculates a partial SAD between the other eight pixel data (0,8) through (0,15) of the current macroblock and the other eight pixel data (0,8) through (0,15) of the first candidate macroblock.

The second sub-tree 212 of the first adder tree array 210 calculates a partial SAD between the eight pixel data (0,0) through (0,7) of the current macroblock and eight pixel data (0,1) through (0,8) of the second candidate macroblock. Also, the second sub-tree 222 of the second adder tree array 220 calculates a partial SAD between the other eight pixel data (0,8) through (0,15) of the current macroblock and the other eight pixel data (0,9) through (0,16) of the second candidate macroblock.

Likewise, the eighth sub-tree 218 of the first adder tree array 210 calculates a partial SAD between the eight pixel data (0,0) through (0,7) of the current macroblock and eight pixel data (0,7) through (0,14) of the eighth candidate macroblock. Also, the eighth sub-tree 228 of the second adder tree array 220 calculates a partial SAD between the other eight pixel data (0,8) through (0,15) of the current macroblock and the other eight pixel data (0,15) through (0,22) of the eighth candidate macroblock.

Meanwhile, due to data input/output characteristics of the first and second pipeline registers 231 and 232, the second adder tree array 220 receives the reference data a clock cycle later than the first adder tree array 210. Also, when the first through eighth candidate macroblocks are processed, the first adder tree array 210 processes reference data (0,0) through (0,14) in the whole search area and the second adder tree array 220 processes reference data (0,8) through (0,22) in the whole search area such that the second adder tree array 220 performs a data processing operation two clock cycles later than the first adder tree array 210.

Figure 6:
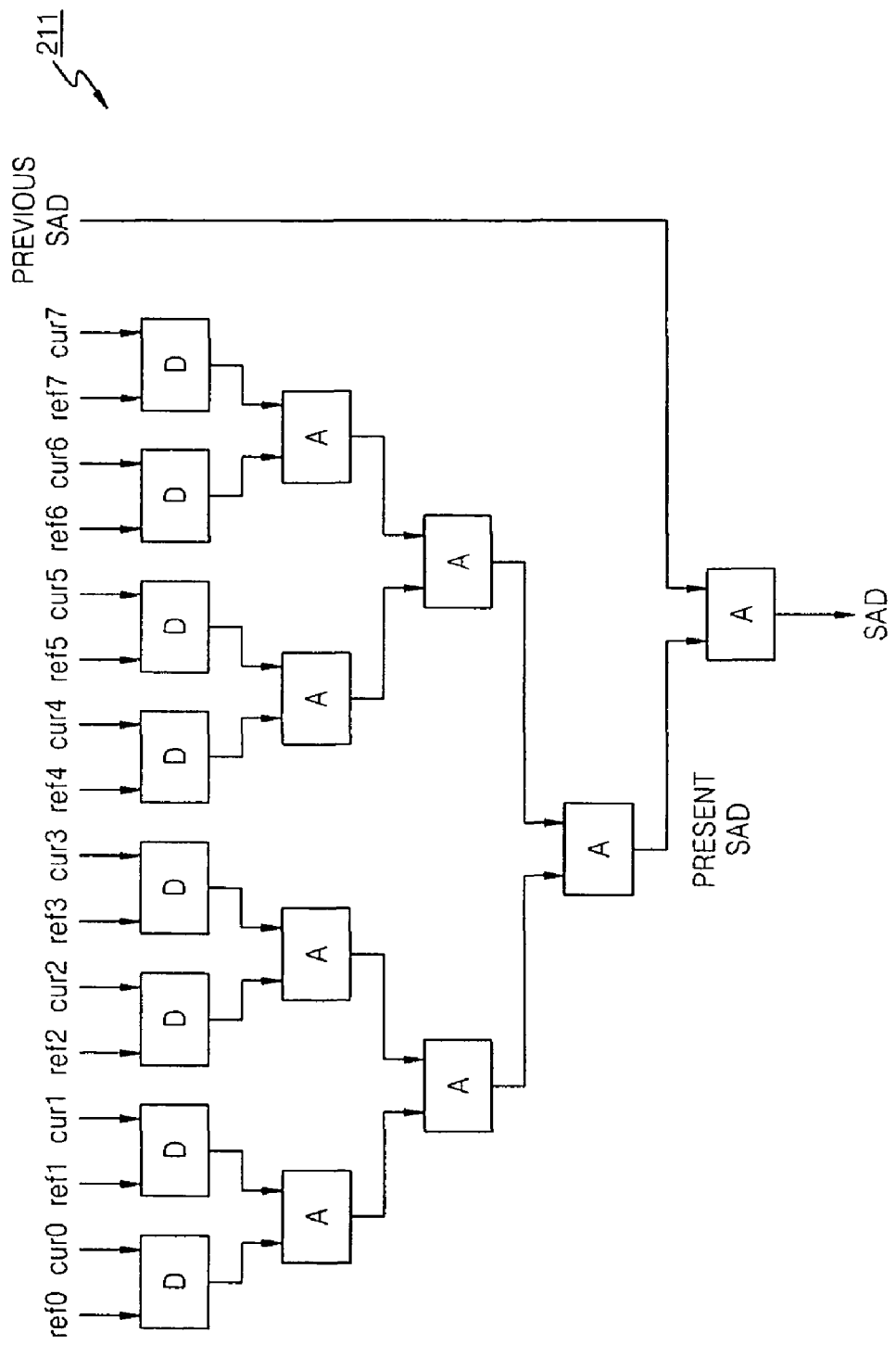
FIG. 6 is a block diagram of an example of a sub-tree illustrated in FIG. 5, according to an embodiment of the inventive concept.

FIG. 6 is a block diagram of an example of the first sub-tree 211 illustrated in FIG. 5, according to an embodiment of the inventive concept. As described above, the first sub-tree 211 is an implementation example when a macroblock includes 16×8 pixels, the processing element 200 illustrated in FIG. 5 includes two adder tree arrays, and each adder tree array includes eight sub-trees, which are arranged in parallel. For convenience of explanation, the first sub-tree 211 of the first adder tree array 210 illustrated in FIG. 5 will be described in detail herein. However, the inventive concept is not limited thereto, and thus, the following explanation applies to any sub-tree of the first and second adder tree arrays 210 and 220 illustrated in FIG. 5.

As illustrated in FIG. 6, the first sub-tree 211 may include a plurality of subtracters D and a plurality of adders A. Each of the subtracters D calculates and outputs a difference between pixel data of a current macroblock and pixel data of a candidate macroblock. The first sub-tree 211 calculates and outputs a difference between eight pixel data (0,0) through (0,7) of a first line of the current macroblock and eight pixel data (0,0) through (0,7) of a first line of the first candidate macroblock. In FIG. 6, input data cur0 through cur7 respectively indicate the eight pixel data (0,0) through (0,7) of the current macroblock and reference data ref0 through ref7 respectively indicate the eight pixel data (0,0) through (0,7) of the first candidate macroblock.

Differences of pixel data, which are calculated by the subtracters D, are summed by the adders A. Then, a partial SAD, which is indicated as 'SAD' in FIG. 6, is calculated by summing a present calculation result PRESENT SAD that is obtained by processing the input data cur0 through cur7 and the reference data ref0 through ref7, and a previous calculation result PREVIOUS SAD that is obtained by sub-trees included in a previous processing element. The partial SAD is provided to corresponding sub-trees of a subsequent processing element. If the first sub-tree 211 processes pixel data of first lines of the current macroblock and a candidate macroblock, the previous calculation result PREVIOUS SAD calculated by a previous processing element does not need to be provided.

Figure 7:
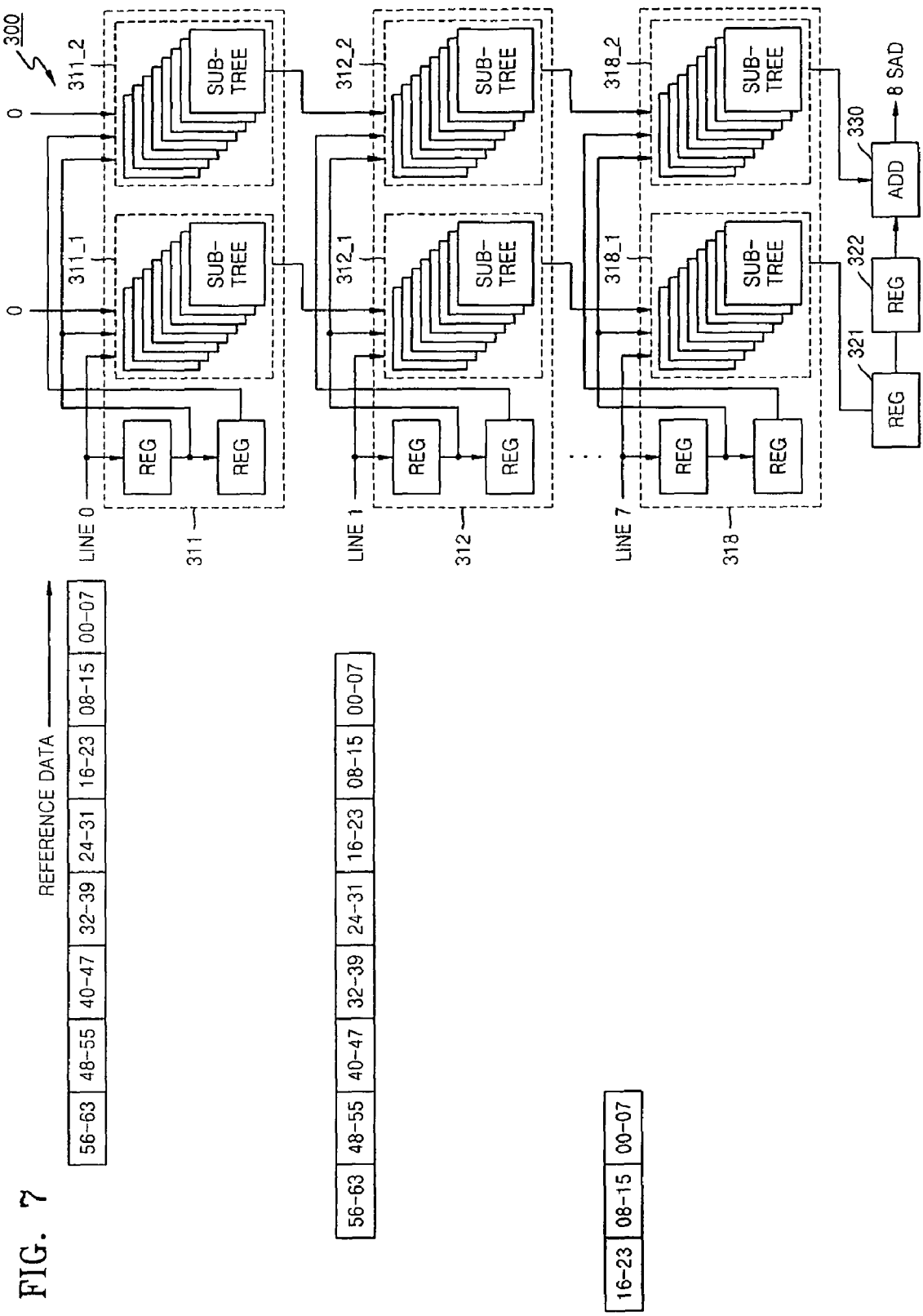
FIG. 7 is a block diagram of a plurality of processing elements forming a two-dimensional (2-D) hybrid tree and linear array architecture, according to an embodiment of the inventive concept.

FIG. 7 is a block diagram of a plurality of processing elements forming a 2-D architecture hybrid tree and linear array 300, according to an embodiment of the inventive concept. The 2-D architecture hybrid tree and linear array 300 includes a plurality of processing elements corresponding to the number Nv of vertical direction pixels of a macroblock. Also, Nv processing elements may be connected in series. For example, in FIG. 7, first through eighth processing elements 311 through 318 are connected in series assuming that the macroblock includes eight vertical-direction pixels.

A processing element calculates a partial SAD on one line of a candidate macroblock. Thus, each of the Nv processing elements which are connected in series calculates a partial SAD on one line of a candidate macroblock. A processing element that calculates a partial SAD of a previous line, provides the calculated partial SAD to a processing element for calculating a partial SAD of a subsequent line.

The motion estimation unit 170 illustrated in FIG. 3 may include the 2-D architecture hybrid tree and linear array 300 illustrated in FIG. 7. The 2-D architecture hybrid tree and linear array 300 may include the first through eighth processing elements 311 through 318 and each of the first through eighth processing elements 311 through 318 may include one or more pipeline registers and adder tree arrays. Also, each adder tree array may include one or more sub-trees, which are arranged in parallel. In addition, the motion estimation unit 170 may include registers 321 and 322 to temporarily store partial SADs provided by the adder tree arrays, and may further include an adder 330 for generating an ultimate SAD by summing the partial SADs provided by the adder tree arrays. In the present embodiment, the motion estimation unit 170 includes two registers 321 and 322. However, the inventive concept is not limited thereto, and the motion estimation unit 170 can include one or more registers.

FIG. 8A is a diagram of an example of a current image macroblock, according to an embodiment of the inventive concept.

Detailed operations of the 2-D architecture hybrid tree and linear array 300 illustrated in FIG. 7 will now be described with reference to FIGS. 7 and 8A. Here, it is assumed that a macroblock, which is a basic unit for motion estimation, includes 16×8 pixels, the number of adder tree arrays Nat included in each processing element is two, and the number of sub-trees Nst included in each adder tree array is eight.

Initially, before a motion estimation operation actually begins, pixel data of a current macroblock are separately pre-loaded to processing elements. For example, if the current macroblock includes 16×8 pixels as illustrated in FIG. 8, pixel data (0,0) through (0,15) of a first line are pre-loaded to the first processing element 311 and pixel data (1,0) through (1,15) of a second line are pre-loaded to the second processing element 312. Likewise, pixel data (7,0) through (7,15) of an eighth line are pre-loaded to the eighth processing element 318.

When pixel data of a current frame are pre-loaded, front eight pixel data (x,0) through (x,7) may be provided to first adder tree arrays and back eight pixel data (x,8) through (x,15) may be provided to second adder tree arrays. For example, eight pixel data (0,0) through (0,7) of the first line may be pre-loaded to a first adder tree array 311-1 of the first processing element 311 and the other eight pixel data (0,8) through (0,15) of the first line may be pre-loaded to a second adder tree array 311-2 of the first processing element 311. Also, the eight pixel data (0,0) through (0,7) of the first line may be commonly provided to eight sub-trees included in the first adder tree array 311-1 of the first processing element 311 and the other eight pixel data (0,8) through (0,15) of the first line may be commonly provided to eight sub-trees included in the second adder tree array 311-2 of the first processing element 311.

Likewise, eight pixel data (1,0) through (1,7) of the second line may be pre-loaded to a first adder tree array 312-1 of the second processing element 312 and the other eight pixel data (1,8) through (1,15) of the second line may be pre-loaded to a second adder tree array 312-2 of the second processing element 312. Also, the eight pixel data (1,0) through (1,7) of the second line may be commonly provided to eight sub-trees included in the first adder tree array 312-1 of the second processing element 312 and the other eight pixel data (1,8) through (1,15) of the second line may be commonly provided to eight sub-trees included in the second adder tree array 312-2 of the second processing element 312. Such a pre-load operation may be performed the same on pixel data of third through eighth lines.

Reference data (pixel data of a previous frame) stored in a data buffer are provided to the first through eighth processing elements 311 through 318 based on a shift operation. A delay time corresponding to one clock cycle exists between reference data provided to two processing elements corresponding to two neighboring lines. For example, in a search area of the previous frame, reference data (0,0) through (0,7) of a first line may be provided to the first processing element 311 in a clock cycle and reference data (1,0) through (1,7) of a second line may be provided to the second processing element 312 in a subsequent clock cycle. When the reference data are provided to the first through eighth processing elements 311 through 318, delay times thereof may be controlled by the delay unit 160 illustrated in FIG. 3.

The adder tree arrays included in the first through eighth processing elements 311 through 318 receive input reference data through one or more registers and calculate partial SADs between the pixel data of the current frame and the reference data of the previous frame. For example, the first adder tree array 311-1 included in the first processing element 311 receives reference data (0,0) through (0,7) and (0,8) through (0,15) of a first line of the whole search area in a predetermined clock cycle and the second adder tree array 311-2 included in the first processing element 311 receives reference data (0,8) through (0,15) and (0,16) through (0,23) of the first line of the whole search area two clock cycles after the predetermined clock cycle.

In more detail, each of the first and second adder tree arrays 311-1 and 311-2 may include eight sub-trees. The eight sub-trees respectively perform a calculating operation on the pixel data of the current frame and pixel data of first through eighth candidate blocks, in parallel.

A first sub-tree included in the first adder tree array 311-1 of the first processing element 311 performs a calculating operation on partial pixel data (for example, eight pixel data) of a first line of a first candidate macroblock so as to output a partial SAD. A first sub-tree included in the first adder tree array 312-1 of the second processing element 312 performs a calculating operation on partial pixel data (for example, eight pixel data) of a second line of the first candidate macroblock so as to output a partial SAD, and the partial SAD output from the first sub-tree included in the first adder tree array 312-1 of the second processing element 312 is summed with the previous partial SAD provided by the first processing element 311. Such an operation is similarly performed by the third through eighth processing elements 313 through 318 connected in series.

A first sub-tree included in the second adder tree array 311-2 of the first processing element 311 performs a calculating operation on the other partial pixel data (for example, the other eight pixel data) of the first line of the first candidate macroblock so as to output a partial SAD. Such an operation is similarly performed by first sub-trees included in second adder tree arrays of the second through eighth processing elements 312 through 318. Ultimately, a partial SAD output from a first sub-tree included in a first adder tree array 318-1 of the eighth processing element 318 is summed with a partial SAD output from a first sub-tree included in a second adder tree array 318-2 of the eighth processing element 318 so that an ultimate SAD on the first candidate macroblock is calculated. The second adder tree array 318-2 operates two clock cycles later than the first adder tree array 318-1 and thus the partial SAD output from the first adder tree array 318-1 may be provided to the adder 330 through the registers 321 and 322.

The above-described operation is performed by first sub-trees in order to calculate an SAD on a first candidate macroblock. Likewise, second through eighth sub-trees respectively calculate SADs on second through eighth candidate macroblocks. The number of SADs, which are simultaneously output, may be controlled in accordance with the number of sub-trees included in each adder tree array.

Figure 8B:
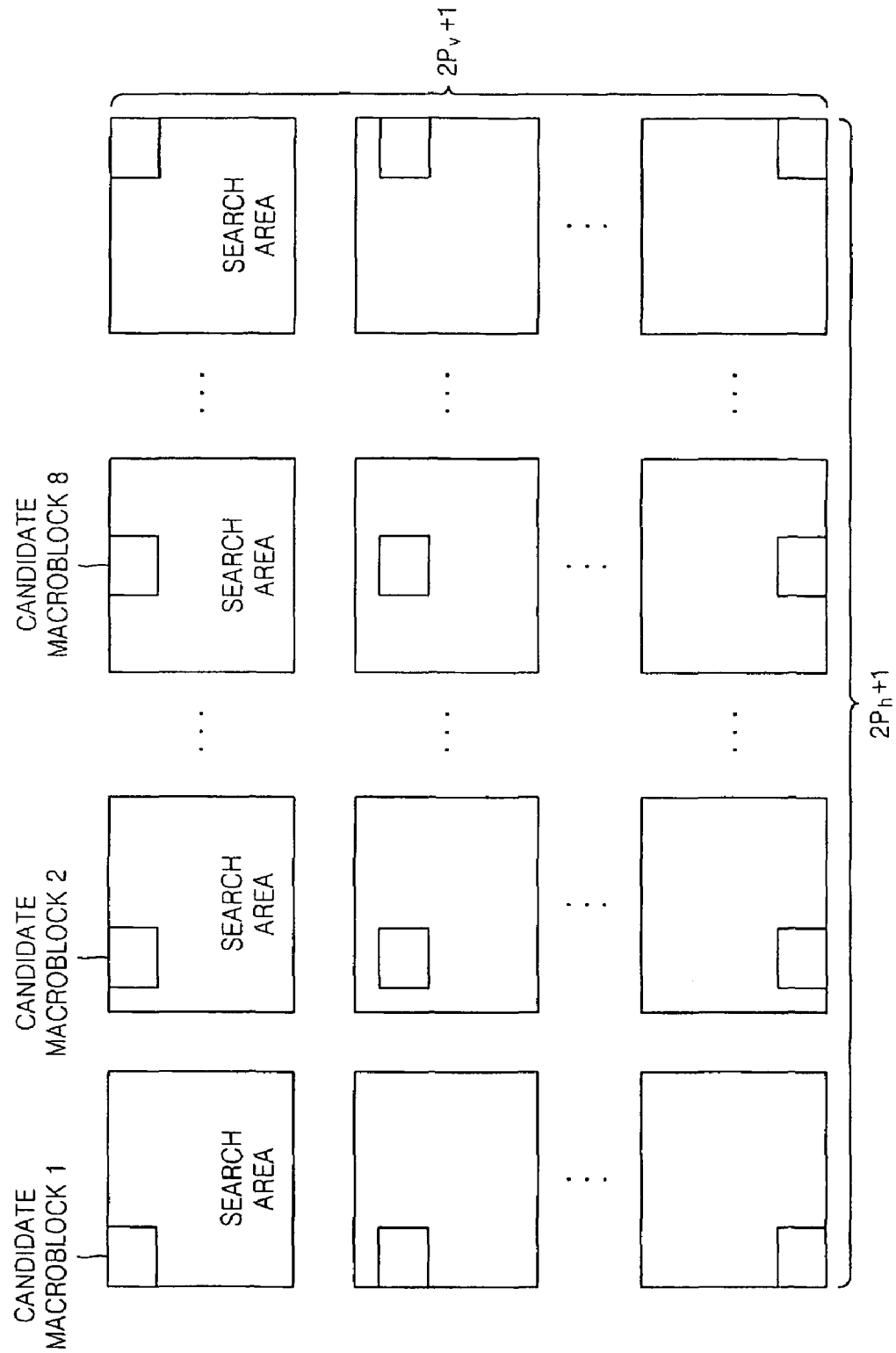
FIG. 8B is a diagram of candidate macroblocks included in a whole search area of a previous frame, according to an embodiment of the inventive concept.

FIG. 8B is a diagram of candidate macroblocks included in a whole search area of a previous frame, according to an embodiment of the inventive concept. As illustrated in FIG. 8B, an SAD is calculated between a macroblock of a current frame and each of a plurality of candidate macroblocks included in a whole search area of a previous frame. In order to calculate a MV corresponding to the macroblock of the current frame, an SAD between the macroblock of the current frame and each of (2Ph+1)×(2Pv+1) the candidate macroblocks has to be calculated. The motion estimation device 100 illustrated in FIG. 3 may improve the operation speed of a whole motion estimation algorithm by calculating a plurality of SADs (for example, eight SADs) in parallel.

FIG. 9 is a table showing characteristics of the motion estimation device 100 illustrated in FIG. 3, according to an embodiment of the inventive concept. Latency occurring due to a data skew corresponds to the value of Nv, and vertical-direction latency occurring when the 2-D architecture hybrid tree and linear array 300 illustrated in FIG. 7 includes Nv processing elements, corresponds to a total of Nv+1. Horizontal-direction latency depends on the number Nat of adder tree arrays and the number Nst of sub-trees. For example, the horizontal-direction latency in a tree architecture is log (Nh)+1 and the horizontal-direction latency in a systolic array architecture is Nh, while the horizontal-direction latency according to an embodiment of the inventive concept corresponds to log(Nh/Nat)+Nat. As shown in FIG. 9, the motion estimation device 100 illustrated in FIG. 3 does not require a large data bandwidth and latency in comparison to conventional devices, and has appropriate tradeoff characteristics for performing motion estimation at a high speed, which is appropriate for processing a high-resolution image.

As described above, according to the inventive concept, a large data bandwidth and latency may not be required and motion estimation may be performed at a high speed. Accordingly, the inventive concept may provide a motion estimation device that is appropriate for processing a high-resolution image.

While the inventive concept has been particularly shown and described with reference to exemplary embodiments thereof, it will be understood that various changes in form and details may be made therein without departing from the spirit and scope of the following claims.

What is claimed is:

1. A motion estimation device providing a motion vector by performing a motion estimation algorithm, the motion estimation device comprising:
a motion estimation unit comprising a plurality of processing elements that perform a calculating operation on pixel data of a block of a current frame and reference data in a search area of a reference frame, and that outputs a plurality of operation results on a plurality of candidate blocks in the search area, in parallel; and
a comparison and selection unit that compares the operation results provided from the motion estimation unit to each other, and that generates and outputs a motion vector corresponding to the block of the current frame,
wherein each of the processing elements comprises first through mth adder tree arrays (m is an integer which is greater than or equal to one), and
wherein each of the first through mth adder tree arrays comprises first through nth sub-trees (n is an integer which is greater than or equal to one), and
wherein the first through nth sub-trees respectively perform the calculating operation on the reference data in different candidate blocks in parallel.

2. The motion estimation device of claim 1, wherein the motion estimation unit calculates and outputs a sum of absolute differences (SAD) between the block of the current frame and each of the candidate blocks.

3. The motion estimation device of claim 2, wherein the block of the current frame or each of the candidate blocks included in the search area comprises Nh×Nv pixels (Nh is the number of horizontal-direction pixels and Nv is the number of vertical-direction pixels),
wherein the number of processing elements is Nv, and wherein each of the processing elements performs a calculating operation on pixel data of one line of the block of the current frame.

4. The motion estimation device of claim 3, wherein pixel data of one line of the block of the current frame is divided into m groups so as to be separately pre-loaded to the first through mth adder tree arrays, and
wherein pixel data pre-loaded to each of the first through mth adder tree arrays is commonly provided to the first through nth sub-trees.

5. The motion estimation device of claim 1, further comprising:
a current image data buffer that stores the pixel data of the block of the current frame;
a reference image data buffer that stores the reference data in the search area of the reference frame; and
a delay unit being connected between the reference image data buffer and the motion estimation unit, and that controls a delay of the reference data to be provided to the motion estimation unit.

6. A motion estimation device providing a motion vector by performing a motion estimation algorithm, the motion estimation device comprising:
a motion estimation unit comprising a plurality of processing elements that perform a calculating operation on pixel data of a block of a current frame and reference data in a search area of a reference frame, and that outputs a plurality of operation results on a plurality of candidate blocks in the search area, in parallel; and a comparison and selection unit that compares the operation results provided from the motion estimation unit to each other, and that generates and outputs a motion vector corresponding to the block of the current frame, wherein the motion estimation unit calculates and outputs a sum of absolute differences (SAD) between the block of the current frame and each of the candidate blocks, wherein the block of the current frame or each of the candidate blocks included in the search area comprises Nh×Nv pixels (Nh is the number of horizontal-direction pixels and Nv is the number of vertical-direction pixels), wherein the number of processing elements is Nv, and wherein each of the processing elements performs a calculating operation on pixel data of one line of the block of the current frame, wherein each of the processing elements comprises first through mth adder tree arrays (m is an integer which is greater than or equal to one), and wherein each of the first through mth adder tree arrays comprises first through nth sub-trees (n is an integer which is greater than or equal to one), wherein pixel data of one line of the block of the current frame is divided into m groups so as to be separately pre-loaded to the first through mth adder tree arrays, wherein pixel data pre-loaded to each of the first through mth adder tree arrays is commonly provided to the first through nth sub-trees, and wherein the first through mth adder tree arrays each sequentially receive the reference data with a delay time corresponding to a predetermined number of clock cycles.

7. The motion estimation device of claim 6, wherein each of the processing elements comprises at least one register for temporarily storing the reference data and providing the reference data to the first through mth adder tree arrays.

8. The motion estimation device of claim 6, wherein each of the first through nth sub-trees receives corresponding reference data of first through nth candidate blocks in the search area, and performs a calculating operation on the pre-loaded pixel data of the current frame and the received reference data so as to output a partial SAD.

9. The motion estimation device of claim 8, wherein the first through nth sub-trees which are included in the Nv processing elements respectively output partial SADs for the first through nth candidate blocks, and wherein the motion estimation unit generates an SAD for each of the first through nth candidate blocks by summing the partial SADs.

10. The motion estimation device of claim 9, wherein the motion estimation unit comprises:

at least one register that stores a partial SAD generated by one of the first through mth adder tree arrays; and an adder that generates at least one SAD by summing the partial SAD stored in the register and a partial SAD generated by another one of the first through mth adder tree arrays.

* * * * *